(12) United States Patent
Blasing

(10) Patent No.: US 6,304,190 B1
(45) Date of Patent: Oct. 16, 2001

(54) METHOD FOR DETERMINING THE ABSOLUTE ANGULAR POSITION OF THE STEERING WHEEL OF A MOTOR VEHICLE, AND OPTOELECRONIC STEERING ANGLE SENSOR

(75) Inventor: Frank Blasing, Werl (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 09/446,212

(22) PCT Filed: Jun. 22, 1998

(86) PCT No.: PCT/EP98/03798

§ 371 Date: Jan. 14, 2000

§ 102(e) Date: Jan. 14, 2000

(87) PCT Pub. No.: WO99/00645

PCT Pub. Date: Jan. 7, 1999

(30) Foreign Application Priority Data

Jun. 28, 1997 (DE) ............................... 197 27 572

(51) Int. Cl.⁷ .................................................. G08B 21/00
(52) U.S. Cl. .................................... 340/686.3; 340/686.1; 340/671; 340/672; 250/231.18; 250/237 G; 702/151
(58) Field of Search ..................................... 340/672, 671, 340/686.3, 686.1; 250/231.14, 231.17, 231.18; 237 G; 180/400; 701/48; 702/151

(56) References Cited

U.S. PATENT DOCUMENTS

| 4,650,335 | 3/1987 | Ito et al. ............................... 356/398 |
| 4,996,657 | * 2/1991 | Shiraishi et al. ..................... 702/151 |

(List continued on next page.)

FOREIGN PATENT DOCUMENTS

| 33 07 639 C2 | 10/1986 | (DE) . |
| 37 31 531 C2 | 5/1990 | (DE) . |

(List continued on next page.)

*Primary Examiner*—Benjamin C. Lee
(74) *Attorney, Agent, or Firm*—Brooks & Kushman P.C.

(57) ABSTRACT

A method of determining the angular position of the steering wheel of a motor vehicle using an optoelectronic steering angel sensor includes disposing a code transmitter between the light source and the line sensor. The line sensor has image points positioned along a line at equal intervals with respect to one another. The line sensor is operable for generating light signals as a function of the position and intensity of light traces imaged onto the image points of the line sensor. The code transmitter concentrically surrounds a steering spindle of a steering wheel of a motor vehicle and is fixed to the steering spindle to rotate therewith. The code transmitter has a scanning line and a reference line for respectively imaging a scanning light trace and a reference light trace from the light source onto the image points of the line sensor. The distance between the scanning line and the reference line is different at each angular position of the steering wheel such that the number of image points between the scanning light trace and the reference light trace imaged onto the line sensor is different at each angular position of the steering wheel. The scanning light trace and the reference light trace each have a respective bright-dark light transition region imaged onto at least two image points of the line sensor. The intensity of the bright-dark transition region varies over the at least two image points. A scanning light signal and a reference light signal generated by the line senor in response to the scanning light trace and the reference light trace imaged onto the line sensor is processed to determine the angular position of the steering wheel as a function of the number of image points between the respective bright-dark light transition regions of the scanning light trace and the reference light trace.

17 Claims, 4 Drawing Sheets

U.S. PATENT DOCUMENTS

| | | | | |
|---|---|---|---|---|
| 5,004,915 | * | 4/1991 | Umehara et al. | 250/231.14 |
| 5,203,420 | * | 4/1993 | Shiraishi | 180/400 |
| 5,243,188 | * | 9/1993 | Hattori et al. | 250/231.17 |
| 5,369,583 | * | 11/1994 | Hazelden | 701/48 |
| 5,841,132 | * | 11/1998 | Horton et al. | 250/231.13 |

FOREIGN PATENT DOCUMENTS

| | | | |
|---|---|---|---|
| 39 14 557 A1 | | 11/1990 | (DE) . |
| 195 00 817 C1 | | 2/1996 | (DE) . |
| 57119215 | * | 7/1982 | (JP) . |

* cited by examiner

METHOD FOR DETERMINING THE ABSOLUTE ANGULAR POSITION OF THE STEERING WHEEL OF A MOTOR VEHICLE, AND OPTOELECRONIC STEERING ANGLE SENSOR

TECHNICAL FIELD

The present invention generally relates to optoelectronic steering angle detection methods and systems. The present invention particularly relates to a method of determining the angular position of the steering wheel of a motor vehicle using an optoelectronic steering angle sensor in which a transparent code trace of a code transmitter images light traces of a light source onto the photosensitive surface of a line sensor such that bright-dark light transitions of the light traces extend over image points of the line sensor for enabling the determination of the angular position of the steering wheel as a function of the bright-dark light transitions.

Furthermore, the present invention particularly relates to an optoelectronic steering angle sensor for determining the angular position of the steering wheel of a motor vehicle having a code transmitter operable to be moved relative to a line sensor by the rotational movement of the steering wheel in which a code trace of the code transmitter images light traces of a light source onto the line sensor for enabling the determination of the angular position of the steering wheel as a function of the light traces imaged onto the line sensor.

BACKGROUND ART

The steering angle or steering angle lock values in motor vehicles influences a driving dynamics control system. In addition to the steering angle values, a driving dynamics control system obtains further measurement data such as the wheel rotational speed or the rotation of the motor vehicle about its vertical axis. The absolute steering angle lock and the steering rate are required so that these values can be evaluated together with the other detected data by the driving dynamics control system. All the data can then be converted for controlling actuators such as brakes and for managing the engine.

An optoelectronic steering angle sensor is disclosed, for example, in DE 40 22 837 A1. The disclosed steering angle sensor includes a light source and a line sensor arranged in parallel and spaced apart from each other and an encoder disc (code transmitter) disposed between the light source and the line sensor. The encoder disc is non-rotatable connected to the steering spindle. The line sensor is a CCD-sensor line. The code transmitter is a light slit disc and includes as a code trace a spiral which increases in size from the inside outwards. From the exposure of the image points of the line sensor in the case of a specific steering lock it is possible to obtain information regarding the actual steering angle lock.

In order that the steering angle data obtained can be used for further processing as an input variable of a driving dynamics control system the data must be highly accurate and have the highest possible resolution. These desired requirements cannot be met by the steering angle sensor or the method which are disclosed in DE 40 22 837 A1. Because the encoder disc is non-rotatable disposed on the steering spindle and the line sensor is fixed in position with respect to the rotational movement of the encoder disc and is thus not attached to the steering spindle, any movements of the steering spindle causing it to move in directions perpendicular to the longitudinal axis are detected as a change in the steering angle lock by the corresponding movement of the encoder disc and the associated movement of the code trace imaged on the line sensor. Accordingly, the driving dynamics control system is also influenced with this type of incorrect information.

The measurement accuracy of the previously known steering angle sensor is determined by the accuracy and the fineness of the code trace and by the imaging sharpness of the light trace of the encoder disc on the line sensor. In order to achieve the most effective imaging sharpness the previously known steering angle sensor uses an elongated light source such as a line-source LED or a longitudinal light source. The length of these light sources corresponds to the length of the sensor line. The emitted light beams impinge upon the surface of the code transmitter at right angles where possible. This feature is intended to achieve the most discrete bright-dark light transition possible in order to be able to exactly determine the light trace on the line sensor. These demands require the encoder disc to be assembled and adjusted precisely with respect to the light source and the line sensor. The resolution which can be achieved even when using a highly accurate code trace corresponds to the physical resolution of the line sensor. Consequently, the resolution of this type of steering angle sensor can be increased merely by using a line sensor with an extremely high number of image points and a code trace having an extremely precise line. However, these features require considerable outlay and place high demands upon the tolerances which are to be maintained.

SUMMARY OF THE INVENTION

On the basis of this discussed prior art, it is therefore an object of the present invention to provide a method of determining the absolute angle position of the steering wheel of a motor vehicle within a segment of 360° precisely and with high resolution. Furthermore, it is the object of the present invention to provide an optoelectronic steering angle sensor which uses common components configured to meet strict resolution requirements.

The method related object is achieved because a scanning line and a reference line are radiated as the code trace by a light source and the scanning line and the reference line light traces are imaged on the photosensitive surface of the line sensor such that bright-dark light transitions extend over image points (pixels) of the line sensor to enable the determination of the angular position of the steering wheel. The angular position is determined by ascertaining accurately in subpixels the distance between corresponding characteristics of the signal clusters of the scanning light trace and the reference light trace as detected by the line sensor. The distance is used as a measure of the absolute angle position of the steering wheel.

The device related object is achieved because the code trace of the code transmitter includes a scanning line and a reference line and the scanning line and the reference line light traces as produced by exposing the code transmitter to light include when imaged on the line sensor a lack of sharpness extending over image points (pixels) in the bright-dark light transition between the bright regions of the light traces and the adjacent dark regions to enable an evaluating unit to ascertain in subpixels the distance between corresponding characteristics of the signal clusters of the scanning light trace and the reference light trace as detected by the line sensor. The distance is used as a measure of the absolute angle position of the steering wheel.

In contrast to the prior art, the steering angle sensor in accordance with the present invention uses the lack of sharpness of the bright-dark light transitions extending over several image points (pixels) of the detected code traces for determining the actual or approximate position of edges of the light traces. This feature has the advantage that only small demands are placed upon the component arrangement and upon the light source. It is prudent to provide a bright-dark light transition region extending over a plurality of image points in order for the discrete signals of the image points radiated by the code trace and designated hereinunder as the signal cluster to use a specific characteristic for determining the steering angle.

In accordance with the present invention, the code transmitter has a scanning line and a reference line. The distance between the scanning line and the reference line is different in each point in the 360° segment for detecting the steering angle. Therefore, the distance at each point between identical characteristics of the signal clusters of the scanning light trace and the reference light trace can be used for determining the absolute steering angle. By determining the distance the steering angle is determined at each point in relation to these two light traces with respect to each other so that movements of the steering spindle moving the steering spindle out of its normal rotational axis in the longitudinal direction of the line sensor are compensated. The distance is determined with subpixel accuracy.

For the steering angle sensor in accordance with the present invention either a light trace can be provided as a scanning line trace and as a reference line trace so that the code transmitter is formed, for example, as a light slit disc, or else a dark trace can be provided on an otherwise bright, transparent code transmitter.

In one exemplified embodiment, the lack of sharpness in the imaging of the light traces is used for calculating an interpolation curve or an interpolation polynomial in the region of one or of both signal flanks of the two light traces. The interpolation produces a quasi-analogue signal on a continuous curve. A comparator connected downstream of the interpolator compares the interpolated signal with a predetermined threshold value. The value ascertained in this manner makes it possible to determine the position more precisely by determining the position in the subpixel range. The output signal of the comparator is a high-resolution transition signal. An evaluating logic processes the high resolution transition signal from the comparator. Using a corresponding oversampling process such as a 16-fold oversampling process it is possible to scan the encoder disc in a step number corresponding to the clock rate of the oversampling process. For example in 16 subpixel steps per image point. The resolution in a circular segment of 360° with 16-fold oversampling process produces an effective resolution of about 1600 steps when a 128 pixel-line sensor is used. In other words, this produces a resolution of 0.225 degrees per subpixel value. By reason of the interpolation error the local linearity deviation inherent in the method is in the range of ±3 subpixel steps (equals ±70) in this arrangement.

In an advantageous manner, the bright-dark light transition of a light trace extends between 10–90% of the transition over 3–10 pixels (image points). It is especially preferred if the bright-dark light transition extends over 5–7 pixels. If a smaller number of pixels is used, the interpolation error is correspondingly greater. When a larger number of pixels is used it could initially be possible to improve the interpolation accuracy. However the local displacement range of the scanning line is then reduced so that the effective resolution of the method does not increase accordingly.

The interpolated signal is compared in an expedient manner in dependence upon the reference line signal. The maximum brightness of the reference light line represents the reference variable. The threshold value amounts in one exemplified embodiment to 50% of the maximum brightness of the reference light trace.

The line sensor and the evaluating logic are triggered in an advantageous manner by one and the same clock-pulse generator so that both elements are clocked in pixel-synchronism.

In accordance with a further exemplified embodiment for determining the distance of predetermined signal characteristics both flanks of the signal cluster of the scanning light trace and the reference light trace can be evaluated in the manner described above and subsequently an average value can be formed from the predetermined flanks. The distance between the two average values is ascertained to determine the distance. In this type of embodiment, this compensates for the "pumping" of the signal cluster or the light traces as produced by a change in distance between the code transmitter and the line sensor.

In accordance with a further exemplified embodiment for determining the distance accurately in subpixels between the scanning light trace and the reference light trace, the pixel-related position of the signal clusters of the two light traces is ascertained in a first step. The signal clusters are then mutually compared with a predetermined reference pulse for ascertaining correlation functions or quadratic error sums. In the case of these comparisons, the reference pulse is moved in a step-wise manner over the signal cluster. In each step a correlation coefficient or a quadratic error sum is ascertained. The step width is smaller than the extension of an image point. The actual distance is determined then by determining the distance between the two extremes of the respectively ascertained function sections.

In one evaluating method, it can be provided that in a first step the sensor line signals are scanned in larger steps with the reference pulse to determine the position of the signal clusters according to a hierarchical search. Likewise, it can be provided that the signal clusters are ascertained by determining the signal cluster flanks of the two light traces during the course of determining the bright-dark light transitions described above.

In order to determine the distance, it is also possible to use a process of determining the center of gravity, according to which method the centers of gravity of the signal clusters are ascertained followed by the distance between the two centers of gravity. Because the process of determining the center of gravity leads to a position of the centres of gravity with subpixel accuracy, the ascertained distance between the two light sources can consequently also be determined with subpixel accuracy.

In one exemplified embodiment, a second line sensor which is influenced by light can be disposed diametrically opposed to the first line sensor for scanning the reference line and the scanning line. This line sensor likewise detects the light traces so that two ascertained angle values are provided for a rotational angle which is to be detected. With the aid of these two detected angle values, it is possible to calculate an averaged angle value which is compensated with respect to the axial clearance of the code transmitter in the rotational plane perpendicular to the sensor longitudinal axis or with respect to the eccentricity of the code transmitter. Furthermore, the use of a second line sensor offers a high degree of protection against errors caused by local optical interference because at each point in time a measurement is made at two positions on the code transmitter which are some distance apart from each other. The probability that local interference will occur at both measuring sites is extremely small, thus reducing considerably the probability that this type of sensor arrangement will break down.

These and other features, aspects, and embodiments of the present invention will become better understood with regard to the following description, appended claims, and accompanying drawings.

BEST MODES FOR CARRYING OUT THE INVENTION

Figure 1:
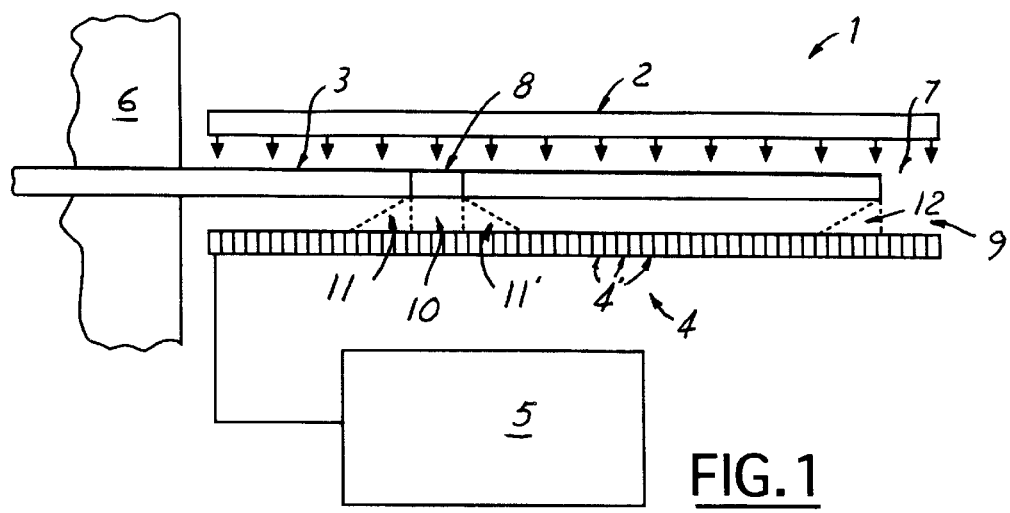
FIG. 1 illustrates a schematic of an optoelectronic steering angle sensor in accordance with the present invention.

FIG. 1 illustrates an optoelectronic steering angle sensor 1 in accordance with the present invention. Optoelectronic steering angle sensor 1 includes a light source 2, an encoder disc 3, a line sensor, namely a CMOS-sensor line 4, and an evaluating unit 5. CMOS-sensor line 4 includes a plurality of individual image points (pixels) 4' disposed adjacent to each other. Light source 2 in the exemplified embodiment shown in FIG. 1 is a linear light source extending over sensor line 4 and emits light at all points in a preferred direction.

Figure 2:
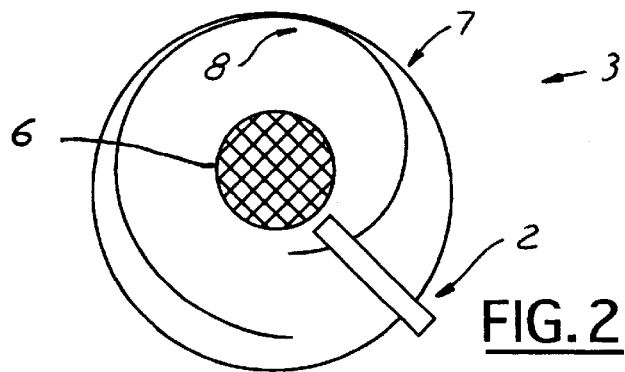
FIG. 2 illustrates a schematic plan view of the steering angle sensor.

Encoder disc 3 is disposed in a non-rotatable manner on a steering spindle 6. With the exception of two light slits 7, 8, encoder disc 3 does not allow the passage of light. Of the two light slits 7, 8, light slit 7 is the reference line and light slit 8 is the scanning line. In the illustrated exemplified embodiment, reference line 7 is formed by the outer edge of encoder disc 3 so that in the plan view the encoder disc is round so as to surround steering spindle 6 concentricly. However, it can also be provided that reference light line 7 is a dedicated concentric opening (slit) in encoder disc 3. It is evident in FIG. 2 that scanning line 8 increases in size from the inside outwards and disposed over 360° is formed in the shape of a spiral. It is possible to obtain a measurement by scanning the distance between light trace 9 of reference line 7 and light trace 10 of scanning line 8 or from the resultant characteristics, the measurement clearly representing the respective steering angle lock over 360°. It is particularly evident in the plan view of FIG. 2 that tolerances with respect to the centricity of encoder disc 3 are not noticeable in this type of distance measurement because they have an equal effect upon reference line 7 and scanning line 8. Furthermore, in the event of a system break-down or when the system is started-up again, the defined nature of the allocation allows the system to function problem-free without having to be recalibrated beforehand.

The light emitted by light source 2 illuminates the entire radius of encoder disc 3 in the region of the side lying opposite CMOS-sensor line 4. The light slits of reference line 7 and scanning line 8 enable respective light traces 9, 10 to be imaged on CMOS-sensor line 4. Light traces 9, 10 are then detected by predetermined image points 4'. The distance of CMOS-sensor line 4 from encoder disc 3 and the emission of non-parallel light from light source 2 cause the edge of reference line 7 or scanning line 8 to be formed in an unsharp manner. Therefore, at each light trace 9, 10 there is a bright-dark light transition region 11, 11', 12. Each bright-dark light transition region 11, 11', 12 extends over a plurality of image points (pixels) 4'. In order to determine the distance, the distance between the bright-dark light transitions regions 11, 12 will be determined hereinunder. The resultant steering angle is determined and calculated in evaluating unit 5 having an input connected to the output of line sensor 4.

Figure 3:
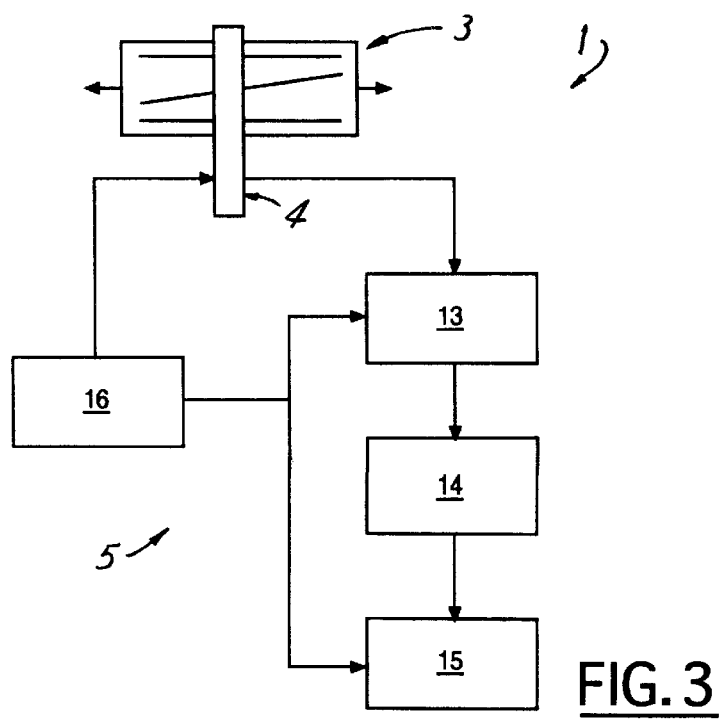
FIG. 3 illustrates a block diagram for operating the steering angle sensor.

As illustrated in FIG. 3 in the form of a block diagram, evaluating unit 5 includes an interpolator 13, a comparator 14, an evaluating logic 15, and a clock-pulse generator 16. Clock-pulse generator 16 clocks CMOS-sensor line 4 and thus determines the scanning rate thereof. The input of interpolator 13 is influenced in correspondingly clocked manner with the line signal or the pixel signals of CMOS-sensor line 4. The shape of this signal is evident in the diagram in FIG. 4. As a result of the low resolution of the imaging the values of the individual image points 4' lying outside the signal flanks are represented as a related signal. The signal changes illustrated in FIG. 4 each correspond to the signal processing steps performed by the electronic components illustrated in FIG. 3. Interpolator 13 initially interpolates the local-discrete CMOS-sensor line signal. In the illustrated exemplified embodiment, the interpolation is performed by calculating an interpolation polynomial which approximates the progression of the signal edge at this point with a predictable level of accuracy. In order to illustrate the interpolation procedure, the interpolation of bright-dark light transition region 11 of FIG. 1 is illustrated, for example, in FIG. 5. In this diagram, the individual image points are plotted on the x-axis and the signal intensity of the individual image points is plotted on the y-axis, representing the local-discrete original signal. The calculated interpolation polynomial 17 approximates the actual progression of the bright-dark light transition.

The interpolated line signal (cf. FIG. 4) influences comparator 14. Comparator 14 performs a comparison of the interpolation polynomial 17 with a predetermined threshold value. In the case of the illustrated exemplified embodiment, 50% of the maximum brightness of reference light trace 9 is provided as a threshold value. By equating the interpolation polynomial 17 with the threshold value 18 the position of the edge of light trace 11 is then determined precisely. The diagram in FIG. 5 reveals the calculated position of the light trace edge and in particular the different position thereof with respect to the position which is otherwise determined alone by the physical pixel resolution. The comparator thus produces a high-resolution transition signal which then influences evaluating logic 15.

Figure 4:
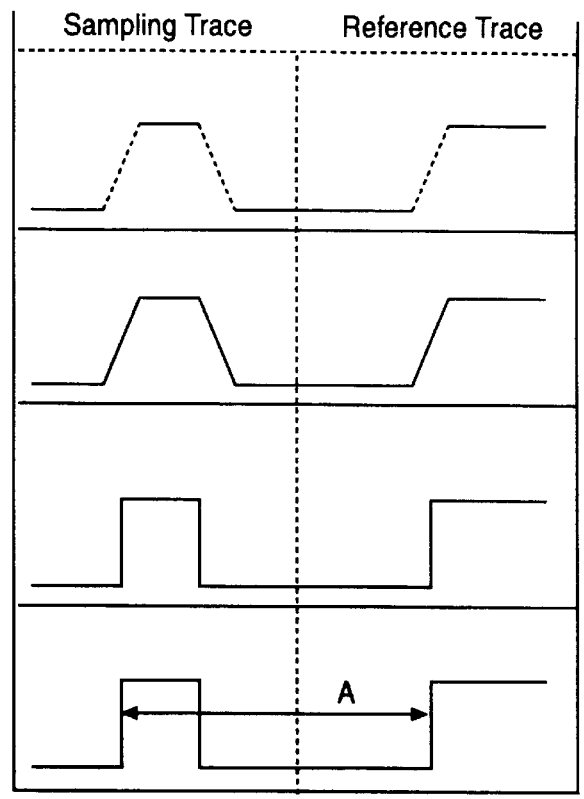
FIG. 4 illustrates a diagram describing the signal processing of the signal scanned using the line sensor of the steering angle sensor.
Figure 5:
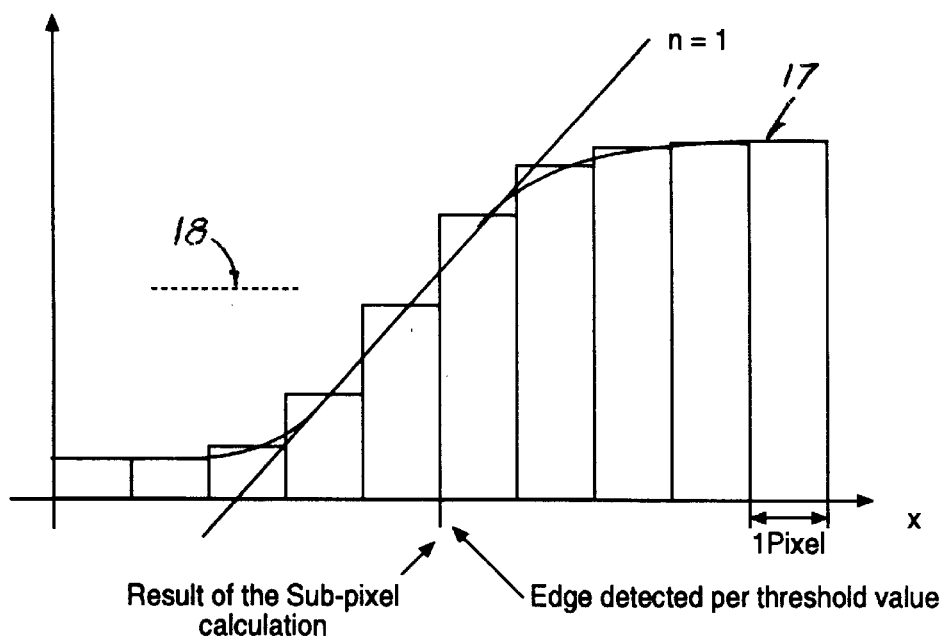
FIG. 5 illustrates a diagram revealing the interpolation algorithm used for the signal processing.

As shown in FIG. 4, evaluating logic 15 determines the distance between the high-resolution edges of the bright-dark light transition regions 11 and 12. The distance between the high-resolution edges of the bright-dark light transition regions 11 and 12 is designated in FIG. 4 by the reference character A.

Clock-pulse generator 16 not only influences CMOS-sensor line 4, but also influences evaluating logic 15 and interpolator 13. Furthermore, evaluating logic 15 causes the image line signal of CMOS-sensor line 4 to be oversampled. In so doing, the prudent maximum oversampling rate, for example a 16-fold pixel clock, is limited in principle merely by the signal-to-noise ratio of the sensor.

Figure 6:
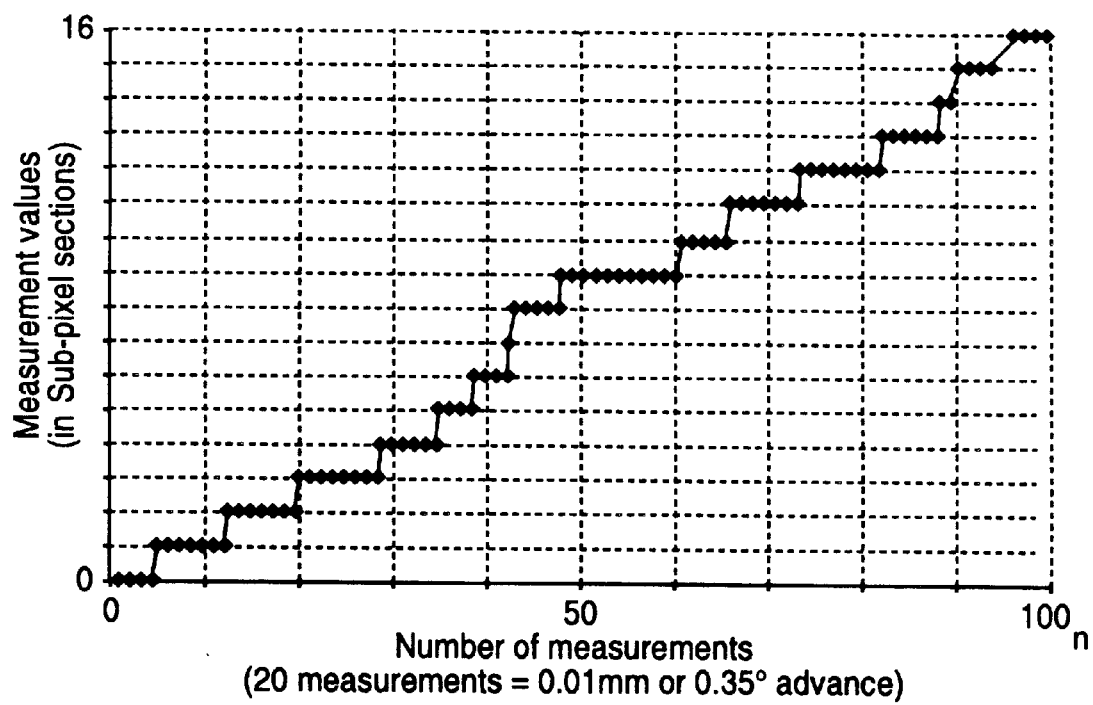
FIG. 6 illustrates a diagram describing the subpixel resolution of the steering angle sensor in the 16-fold oversampling process within one pixel.

The diagram shown in FIG. 6 illustrates the subpixel resolution of steering angle sensor 1 within a single image point 4'. The diagram plots on the y-axis the measurement values of the individual subpixel steps whose number is 16 by reason of the 16-fold over sampling. The x-axis plots the number of measurement values. Encoder disc 3 has been moved by a value of 0.01 mm/s or 0.35°/s for producing the curve. In the case of a CMOS-sensor line 4 having 128 pixels and 16-fold over sampling at 360°, the resolution of the position detection system 1 amounts to about 0.225 degrees per subpixel value in the case of a local linearity deviation of ±3 subpixel values or ±0.7°. These high-resolution measurement values then permit the absolute steering angle to be calculated and this value is transmitted to a driving dynamics control system.

Many different counting devices can be used to detect the number of complete steering wheel turns. For example, the counting device described in DE 195 08 607 C1 to the Applicant can be used.

Figure 7:
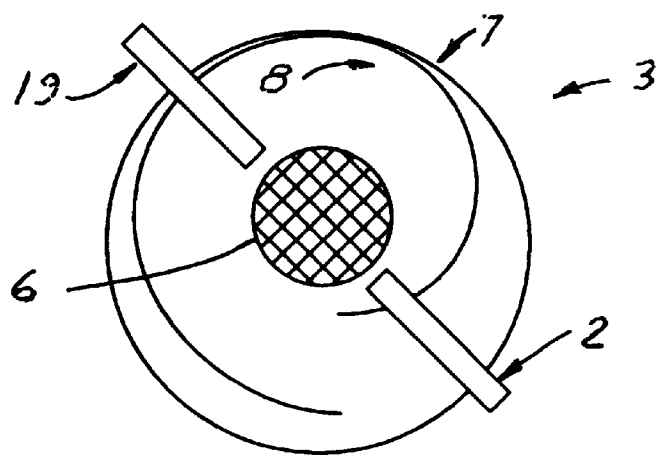
FIG. 7 illustrates a schematic plan view of a further steering angle sensor.

FIG. 7 illustrates position detection system 1 having a second CMOS-sensor line 19. CMOS-sensor line 19 is disposed diametrically with respect to the first CMOS-sensor line 4 and is influenced by light in the same manner as the first CMOS-sensor line 4. The longitudinal axes of the two CMOS-sensor lines 4, 19 are aligned with each other. By using two CMOS-sensor lines 4, 19, it is possible to compensate for the axial clearance in the rotational plane perpendicular to the sensor longitudinal axis and to compensate for any possible eccentricity of encoder disc 3 with respect to the rotational axis of the steering spindle by the formation of an average value. In the event of an exact rotational movement, the same angle displacement is ascertained in each case by the two CMOS-sensor lines 4, 19. In the event of axial clearance perpendicular to the sensor longitudinal axis or of eccentricity of encoder disc 3 the displacement produced by the clearance is detected by the first CMOS-sensor line 4 as a positive angle displacement and is detected by the second CMOS-sensor line 19 as a negative angle displacement. Optionally only one vector of the displacement is detected, i.e., the one which corresponds to the longitudinal axis of the CMOS-sensor lines 4, 19.

By subsequently forming an average value relating to the two angle values ascertained by the two CMOS-sensor lines 4, 19, these characteristics enable both the axial clearance in the sensor direction and also any eccentricity of encoder disc 3 to be compensated for numerically in a particularly efficient manner. Therefore, in the case of a rotational movement:

$$\varphi_{new,compensated} = \frac{(\varphi_{old} + \Delta\varphi)_{sensor1} + (\varphi_{old}\Delta\varphi)_{sensor2}}{2} = \varphi_{old} + \Delta\varphi$$

For axial clearance or center displacement, a resulting interpreted angle displacement gives the equation:

$$\varphi_{new,compensated} = \frac{(\varphi_{old} + \Delta\varphi)_{sensor1} + (\varphi_{old}\Delta\varphi)_{sensor2}}{2} = \varphi_{old}$$

A change in the detected angle can therefore only occur by a rotational movement.

In accordance with a further method, the distance between light trace 10 of scanning line 8 and light trace 9 of reference line 7 is ascertained by a correlation method. For this purpose, a value relating to the position of the signal clusters of scanning light trace 10 and reference light trace 9 is ascertained in a first step. Then, each signal cluster is compared with a reference pulse for producing a correlation function. With respect to its shape, the reference pulse is tailored to suit the expected signal clusters S and can be described, for example, by the function indicated hereinunder:

$$f(x) = \begin{cases} a = \frac{\sin(bx)}{x}, & x \neq 0 \\ a, & x = 0 \end{cases}$$

Figure 8:
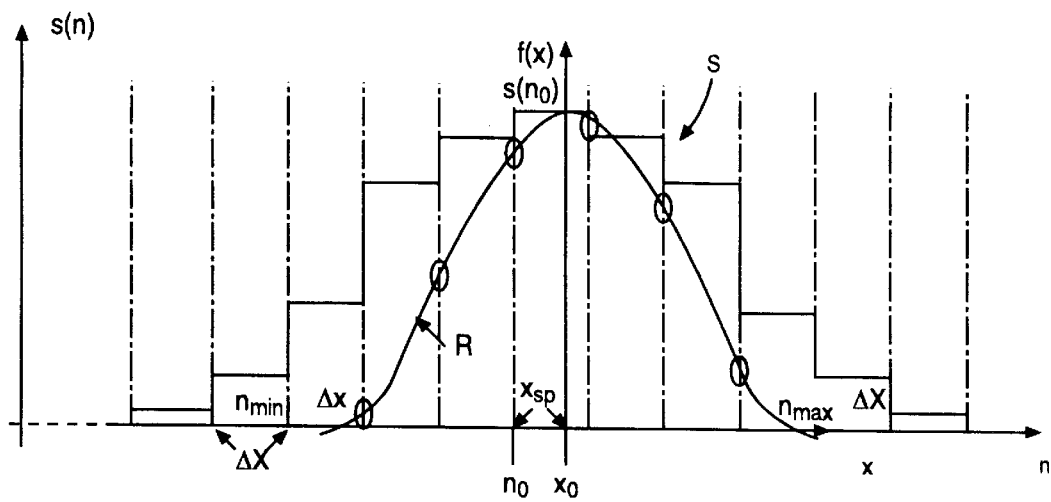
FIG. 8 illustrates a diagram describing a comparison of a signal cluster with a reference pulse.

In order to produce this type of correlation function or the correlation function sections allocated to the signal clusters, the reference pulse is moved in a step-wise manner over the entire extension of the signal cluster S. The selected step width is considerably smaller than the extension of an image point so that the resolution of this distance determination method is accurate in subpixels. As illustrated in FIG. 8, the differences in the detected intensity [s(n)] is compared in each comparison step with the function values of the reference pulse which can be used to determine a correlation coefficient at each step.

Figure 9:
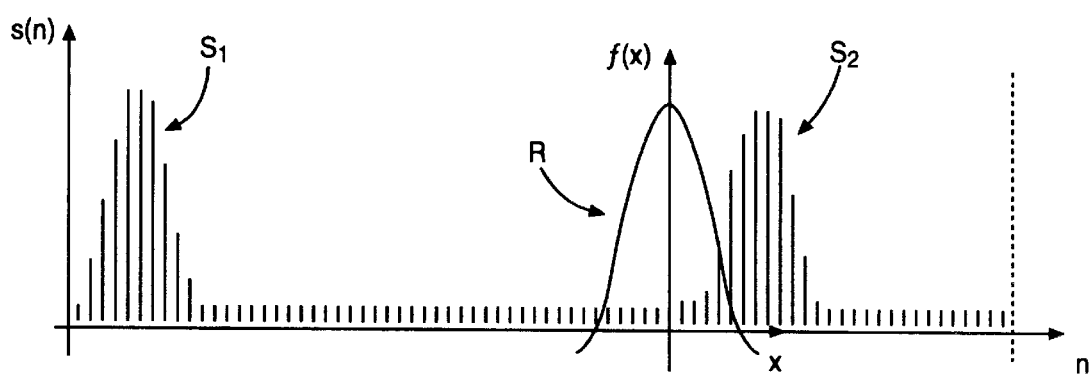
FIG. 9 illustrates a schematic diagram of the process of scanning a signal cluster with a reference pulse.

The step-wise manner of scanning the signal clusters $S_1$ and $S_2$ is illustrated in a schematic manner in FIG. 9. The signal cluster $S_1$ represents reference light trace 9 and the signal cluster $S_2$ represents scanning light trace 10. The distance is determined from ascertaining the distance between the maxima imaged on the correlation function.

Instead of producing correlation coefficients, it is also possible to ascertain in each step the quadratic error sums so that the characteristic for each signal cluster can be identified as a defined minimum. In turn, the distance between these minima is then the measure of the absolute steering angle lock.

The quadratic error sums can be ascertained according to the following equation:

$$K(x_0) = \sum_{n=n_{min}}^{n_{max}} [s(n_0 + n) - f(n \cdot \Delta x - x_{sp})]^2$$

$$\Updownarrow$$

$$K(x_0) = \sum_{n=n_{min}}^{n_{max}} \left[s\left(TRUNC\left(\frac{x_0}{\Delta x}\right) + n\right) - f(n \cdot \Delta x - (x_0 MOD \Delta x)\right]^2$$

Thus it is apparent that there has been provided, in accordance with the present invention, a method of determining the angular position of the steering wheel of a motor vehicle using an optoelectronic steering angle sensor that fully to satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method of determining the angular position of the steering wheel of a motor vehicle, the method comprising:

providing a light source;

providing a line sensor having a plurality of image points positioned along a line at equal intervals with respect to one another, the line sensor operable for generating light signals as a function of the position and intensity of light traces imaged onto the image points of the line sensor;

disposing a code transmitter between the light source and the line sensor, the code transmitter concentrically surrounding a steering spindle of a steering wheel of a motor vehicle and fixed to the steering spindle to rotate therewith with respect to at least one of the light source and the line sensor, the code transmitter having a scanning line and a reference line for respectively imaging a scanning light trace and a reference light trace from the light source onto the image points of the line sensor, wherein the distance between the scanning line and the reference line is different at each angular position of the steering wheel such that the number of image points between the scanning light trace and the reference light trace imaged onto the line sensor is different at each angular position of the steering wheel, wherein the scanning light trace and the reference light trace each have a respective bright-dark light transition region imaged onto at least two image points of the line sensor, wherein the intensity of the bright-dark transition region varies over the at least two image points;

processing a scanning light signal and a reference light signal generated by the line senor in response to the scanning light trace and the reference light trace imaged onto the line sensor to interpolate the scanning light signal and the reference light signal to produce a scanning light trace continuous signal and a reference light trace continuous signal;

comparing the respective scanning and reference light continuous signals with a predetermined threshold value for producing a scanning light transition signal having an edge at a position of the line sensor and a reference light transition signal having an edge at a position of the line sensor; and determining the angular position of the steering wheel as a function of the distance between the edges of the scanning and reference light transition signals.

2. The method of claim 1 wherein:

processing a scanning light signal and a reference light signal further includes sampling the scanning light transition signal and the reference light transition signal at a predetermined clock rate higher than a clock rate for generating the scanning light signal and the reference light signal by the line sensor in response to the scanning light trace and the reference light trace imaged onto the line sensor.

3. The method of claim 1 wherein:

the scanning line is an Archimedean spiral increasing in size from the inside outwards of the code transmitter and has a winding extending around 360°, and the reference line is a concentric line disposed in the peripheral region of the code transmitter.

4. The method of claim 1 wherein:

the scanning line is a helical line and the reference line is a circle having a constant radius with respect to the steering spindle.

5. A method of determining the angular position of the steering wheel of a motor vehicle, the method comprising:

providing a light source;

providing diametrically opposed first and second line sensors each having a plurality of image points positioned along a line at equal intervals with respect to one another, the line sensors each operable for generating light signals a function of the position and intensity of light traces imaged onto the image points of the line sensors;

disposing the second line sensor with its longitudinal axis aligned with the longitudinal axis of the first line sensor;

disposing a code transmitter between the light source and the line sensors, the code transmitter concentrically surrounding a steering spindle of a steering wheel of a motor vehicle and fixed to the steering spindle to rotate therewith with respect to at least one of the light source and the line sensors, the code transmitter having a scanning line and a reference line for respectively imaging a scanning light trace and a reference light trace from the light source onto the image points of the line sensors, wherein the distance between the scanning line and the reference line is different at each angular position of the steering wheel such that the number of image points between the scanning light trace and the reference light trace imaged onto the line sensors is different at each angular position of the steering wheel, wherein the scanning light trace and the reference light trace each have a respective bright-dark light transition region imaged onto at least two image points of the line sensors, wherein the intensity of the bright-dark transition region varies over the at least two image points;

averaging respective scanning and reference light signals generated from the first and second line sensors as a function of the intensity and the position of the light traces imaged onto the image points of the line sensors; and processing the averaged scanning light signal and the averaged reference light signal to determine the angular position of the steering wheel as a function of the distance between the respective bright-dark light transition regions of the averaged scanning light trace and the averaged light trace imaged onto the line sensor.

6. A method of determining the angular position of the steering wheel of a motor vehicle, the method comprising:

providing a light source;

providing a line sensor having a plurality of image points positioned along a line at equal intervals with respect to one another, the line sensor operable for generating light signals as a function of the position and intensity of light traces imaged onto the image points of the line sensor;

disposing a code transmitter between the light source and the line sensor, the code transmitter concentrically surrounding a steering spindle of a steering wheel of a motor vehicle and fixed to the steering spindle to rotate therewith with respect to at least one of the light source and the line sensor, the code transmitter having a scanning line and a reference line for respectively imaging a scanning light trace and a reference light trace from the light source onto the image points of the line sensor, wherein the distance between the scanning line and the reference line is different at each angular position of the steering wheel such that the number of image points between the scanning light trace and the reference light trace imaged onto the line sensor is different at each angular position of the steering wheel, wherein the scanning light trace and the reference light trace each have a respective bright-dark light transition region imaged onto at least two image points of the line sensor, wherein the intensity of the bright-dark transition region varies over the at least two image points;

processing a scanning light signal and a reference light signal generated by the line sensor in response to the scanning light trace and the reference light trace imaged onto the line sensor to compare the scanning light signal and the reference light signal with a predetermined reference pulse for determining correlation coefficients; and determining the angular position of the steering wheel as a function of the distance between extremes of the determined correlation coefficients.

7. A method of determining the angular position of the steering wheel of a motor vehicle, the method comprising:

providing a light source;

providing a line sensor having a plurality of image points positioned along a line at equal intervals with respect to one another, the line sensor operable for generating light signals as a function of the position and intensity of light traces imaged onto the image points of the line sensor;

disposing a code transmitter between the light source and the line sensor, the code transmitter concentrically surrounding a steering spindle of a steering wheel of a motor vehicle and fixed to the steering spindle to rotate therewith with respect to at least one of the light source and the line sensor, the code transmitter having a scanning line and a reference line for respectively imaging a scanning light trace and a reference light trace from the light source onto the image points of the line sensor, wherein the distance between the scanning line and the reference line is different at each angular position of the steering wheel such that the number of image points between the scanning light trace and the reference light trace imaged onto the line sensor is different at each angular position of the steering wheel, wherein the scanning light trace and the reference light trace each have a respective bright-dark light transition region imaged onto at least two image points of the line sensor, wherein the intensity of the bright-dark transition region varies over the at least two image points;

processing a scanning light signal and a reference light signal generated by the line senor in response to the scanning light trace and the reference light trace imaged onto the line sensor to determine focal points of the respective bright-dark transition regions of the scanning light signal and the reference light signal imaged onto the line sensor as a function of the position and intensity of the light traces imaged onto the line sensor; and determining the angular position of the steering wheel as a function of the number of image points between the focal points of the respective bright-dark light transition regions of the scanning light trace and the reference light trace imaged onto the line sensor.

8. The method of claim 7 further comprising:

providing a second line sensor diametrically opposed to the first line sensor, the second line sensor having a plurality of image points positioned along a line at equal intervals with respect to one another and operable for generating light signals as a function of the position and intensity of light traces imaged onto the image points of the second line sensor;

disposing the second line sensor with its longitudinal axis aligned with the longitudinal axis of the first line sensor; and averaging focal points of respective scanning and reference light signals generated from the first and second line sensors to compensate for the axial clearance and the eccentricity of the code transmitter;

wherein determining the angular position of the steering wheel includes determining the angular position of the steering wheel as a function of the number of image points between the averaged focal points of the respective bright-dark light transition regions of the scanning light trace and the reference light trace imaged onto the line sensor.

9. An optoelectronic steering angle sensor for determining the angular position of a steering wheel of a motor vehicle, the sensor comprising:

a light source;

a line sensor having a plurality of image points positioned along a line at equal intervals with respect to one another, the line sensor operable for generating light signals as a function of light traces imaged onto the image points of the line sensor;

a code transmitter disposed between the light source and the line sensor, the code transmitter concentrically surrounding a steering spindle of a steering wheel of a motor vehicle and fixed to the steering spindle to rotate therewith with respect to at least one of the light source and the line sensor, the code transmitter having a scanning line and a reference line for respectively imaging a scanning light trace and a reference light trace from the light source onto the image points of the line sensor, wherein the distance between the scanning line and the reference line is different at each angular position of the steering wheel such that the number of image points between the scanning light trace and the reference light trace imaged onto the line sensor is different at each angular position of the steering wheel, wherein the scanning light trace and the reference light trace each have a respective bright-dark light transition region imaged onto at least two image points of the line sensor; and an evaluating unit operable with the line sensor for processing a scanning light signal and a reference light signal generated by the line sensor in response to the scanning light trace and the reference light trace imaged onto the line sensor, the evaluating unit further operable for interpolating the scanning light signal and the reference light signal to produce a scanning light trace continuous signal and a reference light trace continuous signal, for comparing the respective scanning and reference light trace continuous signals with a predetermined threshold value for producing a scanning light trace transition signal having an edge and reference light trace transition signal having an edge, and for determining the angular position of the steering wheel as a function of the distance between the respective edges of the scanning light trace and the reference light trace imaged onto the line sensor.

10. The sensor of claim 9, wherein the evaluating unit further comprises:

a clock generator operable with the line sensor to cause the evaluating unit to sample the scanning light transition signal and the reference light transition signal at a predetermined clock rate higher than a clock rate for the line sensor generating the scanning light signal and the reference light signal in response to the scanning light trace and the reference light trace imaged onto the line sensor.

11. The sensor of claim 9 wherein:

the code transmitter, the light source, and the line sensor are configured such that the respective bright-dark light transition regions of the scanning light trace and the reference light trace imaged onto the line sensor are imaged over 3 to 10 image points of the line sensor.

12. The sensor of claim 9 wherein:

the code transmitter is an encoder disc.

13. The sensor of claim 9 wherein:

the scanning line is an Archimedean spiral increasing in size from the inside outwards of the code transmitter and has a winding extending around 360°, and the reference line is a concentric line disposed in the peripheral region of the code transmitter.

14. The sensor of claim 9 wherein:

the code transmitter is disposed on a cylinder disposed coaxially with respect to the rotational axis of the steering spindle.

15. The sensor of claim 9 wherein:

the scanning line is a helical line and the reference line is a circle having a constant radius with respect to the axis of the steering spindle.

16. An optoelectronic steering angle sensor for determining the angular position of a steering wheel of a motor vehicle, the sensor comprising:

a light source;

a first line sensor having a plurality of image points positioned along a line at equal intervals with respect to one another, the first line sensor operable for generating light signals as a function of light traces imaged onto the image points of the first line sensor;

a second line sensor diametrically opposed to the first line sensor, the second line sensor having a plurality of image points positioned along a line at equal intervals with respect to one another, the second line sensor operable for generating light signals as a function of light traces imaged onto the image points of the second line sensor, wherein the second line sensor is disposed with its longitudinal axis aligned with the longitudinal axis of the first line sensor;

a code transmitter disposed between the light source and the line sensors, the code transmitter concentrically surrounding a steering spindle of a steering wheel of a motor vehicle and fixed to the steering spindle to rotate therewith with respect to at least one of the light source and the line sensors, the code transmitter having scanning and reference lines for respectively imaging scanning and reference light traces from the light source onto the image points of the line sensors, wherein the distance between the scanning and reference lines is different at each angular position of the steering wheel such that the number of image points between the scanning and reference light traces imaged onto the line sensors is different at each angular position of the steering wheel, wherein the scanning and reference light traces each have a respective bright-dark light transition region imaged onto at least two image points of the line sensors; and an evaluating unit operable with the line sensors for averaging respective scanning and reference light signals generated from the line sensors as a function of the intensity and position of the light traces imaged onto the image points of the line sensors, wherein the evaluating unit is further operable for processing the averaged scanning and reference light signals to determine the angular position of the steering wheel as a function of the distance between the respective bright-dark light transition regions of the averaged scanning and reference light traces.

17. An optoelectronic steering angle sensor for determining the angular position of a steering wheel of a motor vehicle, the sensor comprising:

a light source;

a line sensor having a plurality of image points positioned along a line at equal intervals with respect to one another, the line sensor operable for generating light signals as a function of light traces imaged onto the image points of the line sensor;

a code transmitter disposed between the light source and the line sensor, the code transmitter concentrically surrounding a steering spindle of a steering wheel of a motor vehicle and fixed to the steering spindle to rotate therewith with respect to at least one of the light source and the line sensor, the code transmitter having a scanning line and a reference line for respectively imaging a scanning light trace and a reference light trace from the light source onto the image points of the line sensor, wherein the distance between the scanning line and the reference line is different at each angular position of the steering wheel such that the number of image points between the scanning light trace and the reference light trace imaged onto the line sensor is different at each angular position of the steering wheel, wherein the scanning light trace and the reference light trace each have a respective bright-dark light transition region imaged onto at least two image points of the line sensor; and an evaluating unit operable with the line sensor for processing a scanning light signal and a reference light signal generated by the line sensor in response to the scanning light trace and the reference light trace imaged onto the line sensor to determine focal points of the respective bright-dark light transition regions of the scanning light signal and the reference light signal imaged onto the line sensor as a function of the position and intensity of the light traces imaged onto the line sensor, wherein the evaluating unit is further operable for determining the angular position of the steering wheel as a function of the distance between the focal points of the respective bright-dark light transition regions of the scanning light trace and the reference light trace.

* * * * *

UNITED STATES PATENT AND TRADEMARK OFFICE
CERTIFICATE OF CORRECTION

PATENT NO.    : 6,304,190 B1  
DATED         : October 16, 2001  
INVENTOR(S)   : Frank Blasing Page 1 of 1

It is certified that error appears in the above-identified patent and that said Letters Patent is hereby corrected as shown below:

<u>Column 10,</u>
Line 3, after "the" insert -- axis of the --.
Line 12, after "signals" insert -- as --.

<u>Column 13,</u>
Line 1, after "9" please delete -- , --.

Signed and Sealed this

Fourteenth Day of May, 2002

Attest:

*Attesting Officer*

JAMES E. ROGAN  
*Director of the United States Patent and Trademark Office*